Figure 1:
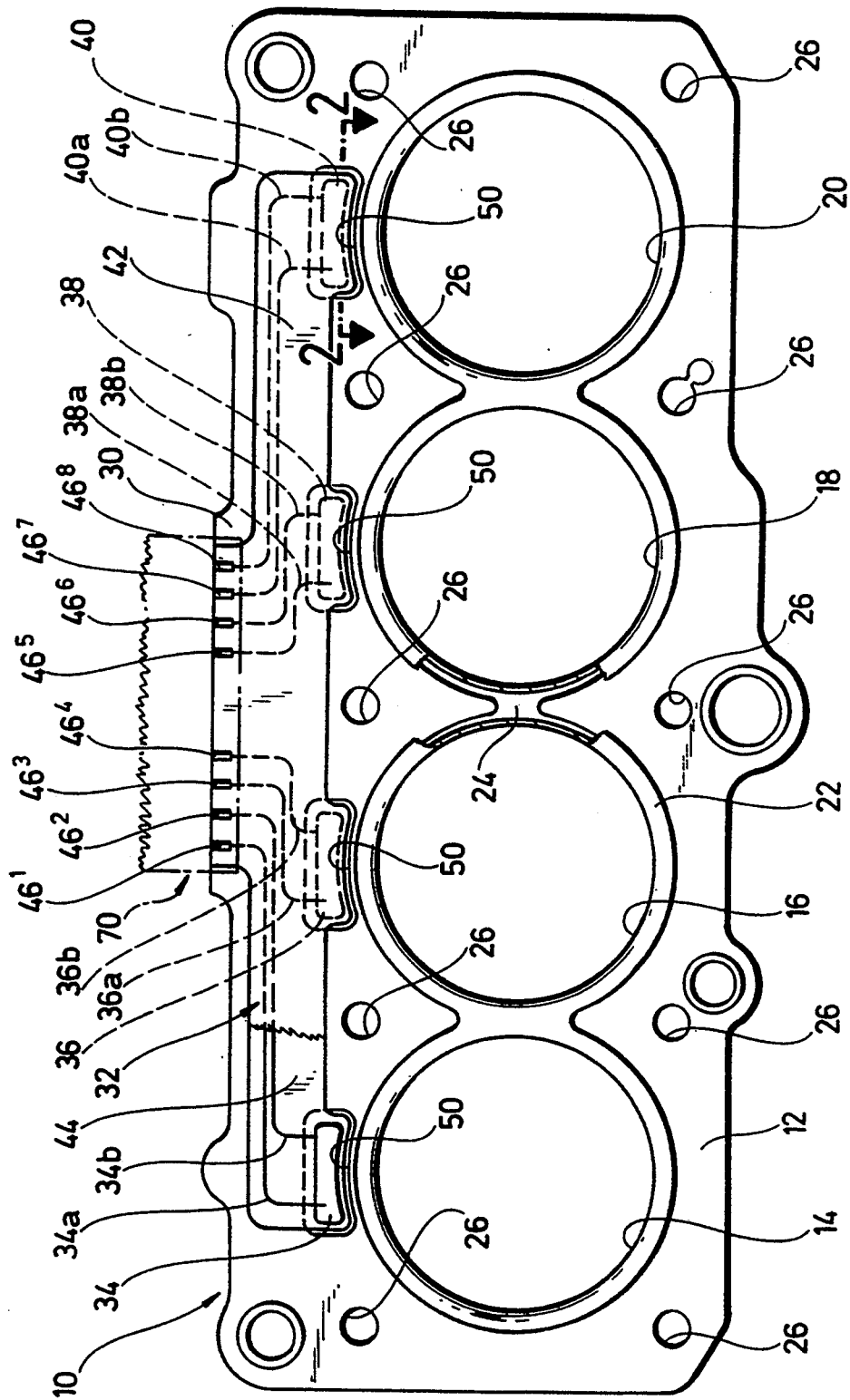

United States Patent [19]

Schäperkötter

[11] Patent Number: 5,380,014

[45] Date of Patent: Jan. 10, 1995

[54] CYLINDER HEAD GASKET

[75] Inventor: Heinrich Schäperkötter, Dettingen, Germany

[73] Assignee: Elring Dichtungswerke GmbH, Fellbach, Germany

[21] Appl. No.: 809,495

[22] PCT Filed: May 11, 1991

[86] PCT No.: PCT/EP91/00879

§ 371 Date: Jan. 8, 1992

§ 102(e) Date: Jan. 8, 1992

[87] PCT Pub. No.: WO91/18198

PCT Pub. Date: Nov. 28, 1991

[30] Foreign Application Priority Data

May 11, 1990 [DE] Germany .............. 4015109

[51] Int. Cl.6 .............................................. F16J 15/32
[52] U.S. Cl. ................................. 277/2; 277/235 B; 277/901; 73/35; 123/425
[58] Field of Search .................. 277/2, 235 B, 235 A, 277/227, 901; 73/35, 115, 862, 68; 310/338; 361/283; 338/5; 250/227.14; 123/425

[56] References Cited

U.S. PATENT DOCUMENTS

| | | | |
|---|---|---|---|
| 2,879,450 | 3/1959 | Baker | 73/35 |
| 3,151,258 | 9/1964 | Sendergger et al. | 73/35 |
| 4,337,641 | 7/1982 | Sugihara et al. | 73/35 |
| 4,358,952 | 11/1982 | Maurer et al. | 73/35 |
| 4,397,176 | 8/1983 | Rohde et al. | 73/35 |
| 4,417,170 | 11/1983 | Benincasa | 310/345 |
| 4,520,678 | 6/1984 | Koziol et al. | 73/861.24 |
| 4,685,469 | 8/1987 | Keller | 128/675 |
| 4,686,861 | 8/1987 | Morii | 73/35 |
| 4,734,034 | 3/1988 | Maness et al. | 433/68 |
| 4,780,015 | 10/1988 | Anderson et al. | 400/662 |
| 4,810,454 | 3/1989 | Belter | 277/235 B |
| 4,814,562 | 3/1989 | Langston | 250/227 |
| 5,121,929 | 6/1992 | Cobb | 277/2 |

FOREIGN PATENT DOCUMENTS

| | | |
|---|---|---|
| 2917406 | 11/1980 | Germany . |
| 3001711 | 7/1981 | Germany . |
| 3006603 | 9/1981 | Germany . |
| 3106993 | 9/1982 | Germany . |
| 8903520 | 4/1989 | WIPO . |

OTHER PUBLICATIONS

Stecher, ATZ 70 (German document) 1968, pp. 209–212.

Primary Examiner—Daniel G. DePumpo
Attorney, Agent, or Firm—Edward J. Timmer

[57] ABSTRACT

Cylinder head gasket for sealing the sealing gap between engine block and cylinder head of a multi-cylinder internal combustion engine comprising a sealing plate with several combustion chamber orifices, combustion chamber sealing elements at the edges of the sealing plate which surround the combustion chamber orifices and a sensor element for detecting sealing gap movements, wherein for the cylinder-specific detection of the sealing gap movements perpendicular to the plane of the sealing plate which are caused by the pressure changes in the respective combustion chamber, the sealing plate is provided with several sensor elements associated with the combustion chamber orifices, the sensor elements are arranged outside of the combustion chamber sealing elements and the sensor elements belong to the following group: piezoelectric, piezoresistive and capacitive sensors as well as glass fiber light guide sensors with transmission loss which is changeable by bending the light guide axis.

23 Claims, 4 Drawing Sheets

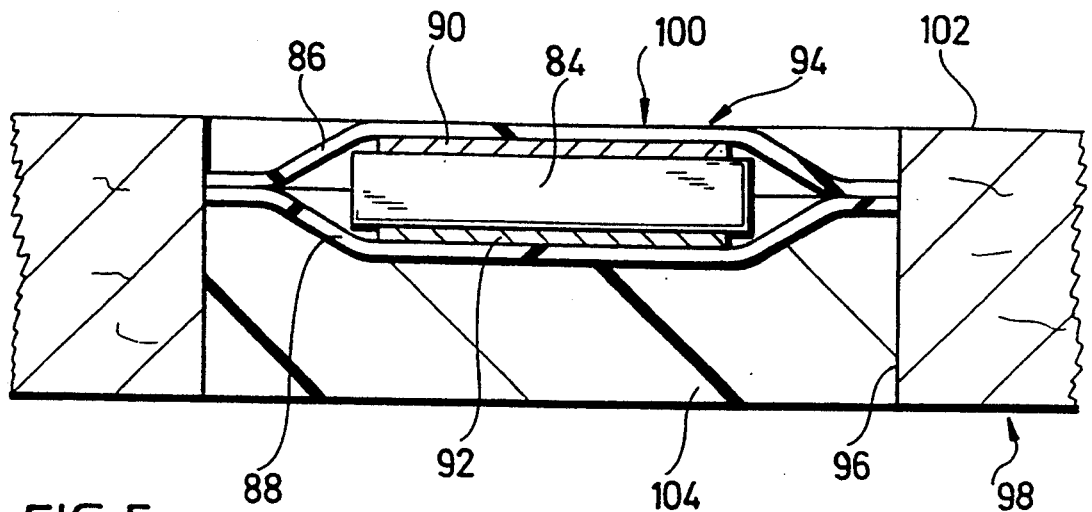
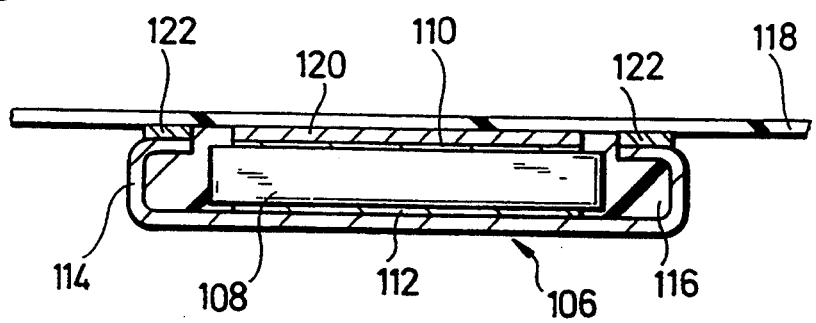
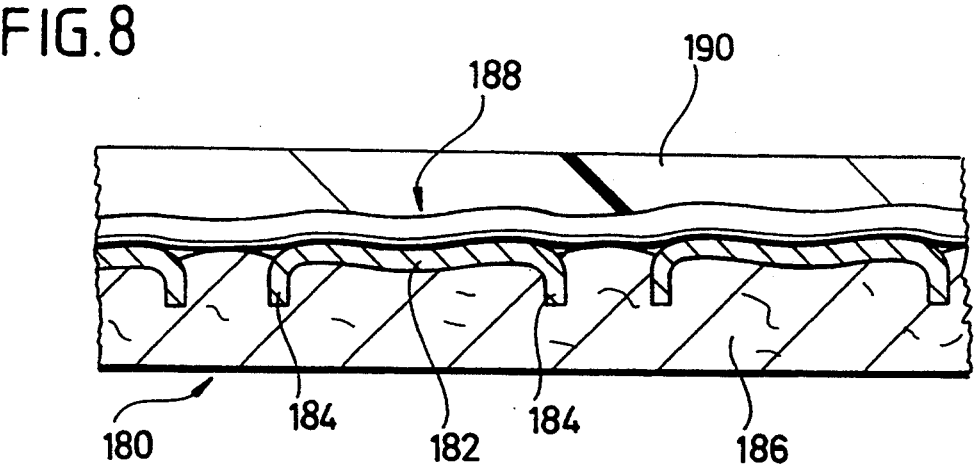

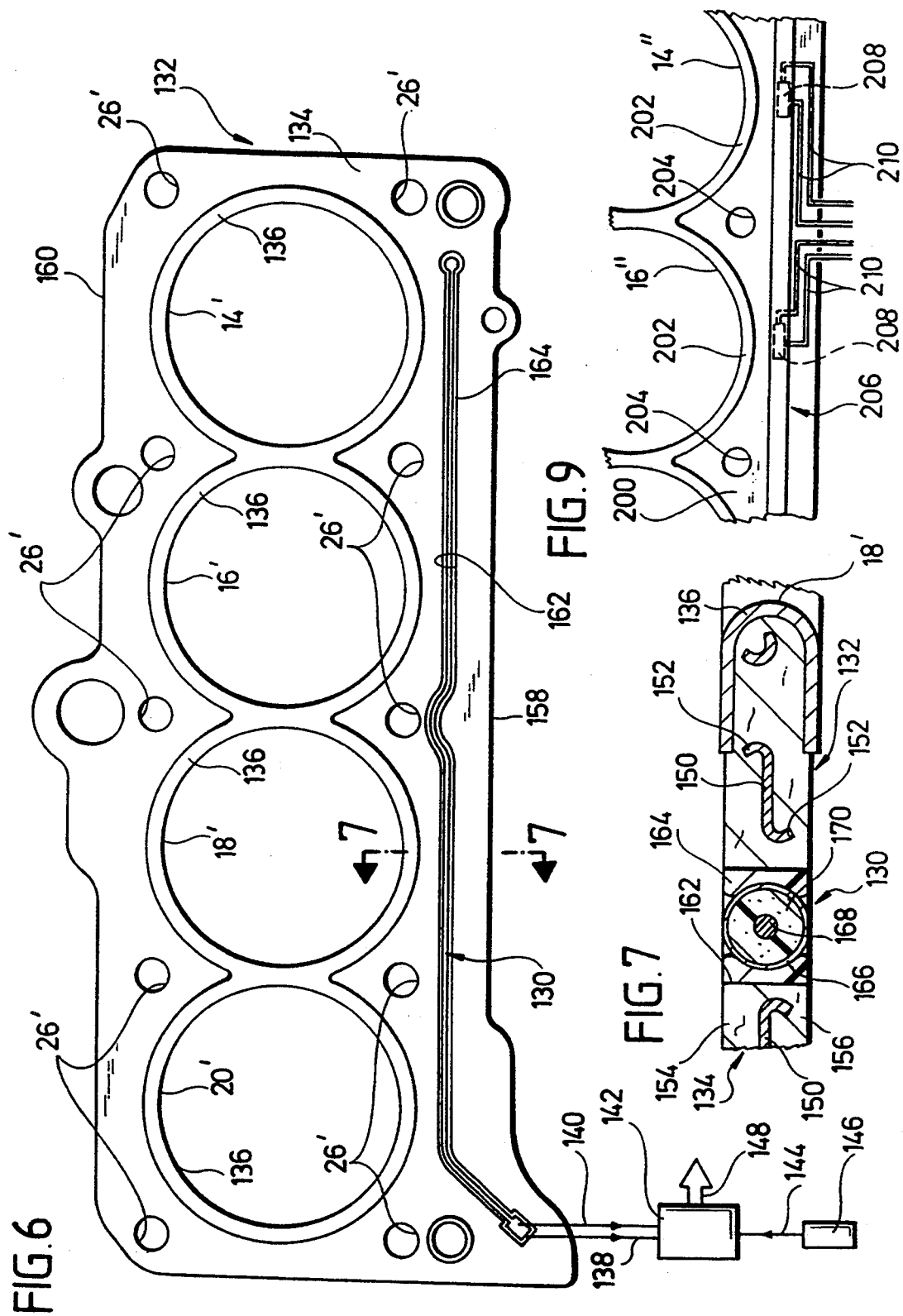

CYLINDER HEAD GASKET

The invention relates to a cylinder head gasket for sealing the sealing gap between the engine block and the cylinder head of a multi-cylinder internal combustion engine comprising a sealing plate with several combustion chamber orifices, combustion chamber sealing elements at the edges of the sealing plate which surround the combustion chamber orifices and a sensor element for detecting sealing gap movements.

When hereinabove and hereinbelow reference is made to combustion chamber sealing elements, so-called combustion chamber borders are also to be understood by these, i.e., ring-shaped sheet metal elements of L- or C-shaped cross section which border the edges of the sealing plate surrounding the combustion chamber orifices.

Electronic means are used increasingly for the controlling, regulating and monitoring of reciprocating internal combustion engines. Owing to the use of less and less expensive microprocessors, the total cost of the control and/or regulating and/or monitoring circuits is essentially determined by the cost of the sensors. As the cylinder head gasket is directly exposed to the influence of the combustion process in a reciprocating internal combustion engine, it is the ideal location for placing sensors for determining the operating parameters of the internal combustion engine for the use of sensors designed as separate components often fails for cost and space reasons as is, for example, the case with the restricted installation possibilities in a 4-valve engine.

There is known from DE-OS 2 917 406 (FIG. 1 in conjunction with claims 1 and 2) a cylinder head gasket with a sensor integrated in the sealing plate for detecting the oscillations which occur with knocking combustion. The actual sensor is in the form of an electric resistance section consisting of carbon powder and is arranged in a cavity located inside the soft material essentially forming the sealing plate in the immediate vicinity of a cylinder head screw. The sensor thus operates according to the principle of the known carbon microphone and registers the pressure which prevails at its location in the sealing gap and changes with respect to time.

Purposeful monitoring and/or control and/or regulation of the engine which is capable of meeting today's requirements should, however, enable cylinder-selective detection of the operating parameters so that, for example, the combustion process can be separately monitored for each individual cylinder—it is quite possible that knocking combustion will occur in one of the cylinders but not in the other cylinders (owing to, for example, the different cooling conditions of the cylinders and deposits in the combustion chambers). The same applies to so-called misfirings as a result of, for example, failure of a spark plug, to pre-ignitions, to retarded combustion or to the changing of the injection behavior in diesel engines. It has, however, been shown that cylinder-selective detection of certain operating data is not possible with the sensor means known from DE-OS 2 917 406.

There is known from DE-OS 3 006 603 a cylinder head gasket with temperature sensors integrated in its sealing plate. The purpose of the temperature sensors is to detect a knocking combustion process. This prior art discloses two basically different variants: In a first group of embodiments of the known cylinder head gasket (see FIGS. 2, 3, 5 to 7 and 9) the sealing plate has a combustion chamber border for each combustion chamber orifice, and the temperature sensors are arranged within these combustion chamber borders. If on account of the inability of a temperature sensor to detect a knocking combustion process which does not occur constantly, the temperature sensors in this known cylinder head gasket were replaced by sensors suitable for detecting sealing gap movements, these would be exposed to much too high temperatures because of their arrangement within the combustion chamber border. Furthermore, such a solution could not be implemented at least with the present state of the art for space reasons, and, finally, the sealing gap oscillations would only be detected by the flange surfaces of the combustion chamber borders of approximately C-shaped cross section, which would result in sensor signals which are too indefinite. Any integration of a sensor in a combustion chamber border also results in inhomogeneity of the combustion chamber border and hence in a local weak spot which endangers the reliability of the combustion chamber sealing. In the variant shown in FIG. 1 of DE-OS 3 006 603, the sealing plate has neither a combustion chamber border nor a combustion chamber sealing element at the combustion chamber orifices. A temperature sensor arranged directly at the edge of the respective combustion chamber orifice would, however, lie within a combustion chamber border if this combustion chamber orifice were provided with such a combustion chamber border, which would have the consequences explained hereinabove.

DE-OS 3 001 711 discloses a cylinder head gasket with light guides arranged on its sealing plate. These terminate in openings of combustion chamber borders and hence at the combustion chambers in order to detect fluctuations in brightness which are caused by the strong gas oscillations which occur during a knocking combustion process (see FIG. 5 in conjunction with FIG. 4). Therefore, in this known cylinder head gasket, a light guide represents a pure optical system and does not constitute a sensor. This known cylinder head gasket also has the disadvantage of having unavoidable weak spots in combustion chamber borders or sealing elements through which the light guides have to be led.

The object underlying the invention was to enable in a multi-cylinder internal combustion engine cylinder-selective detection of the combustion process with less expenditure than in known constructions which operate, for example, with sensors integrated in the spark plugs or with sensors designed as separate components and mounted in the cylinder head.

To accomplish this object, one resorts, in accordance with the invention, to a cylinder head gasket of the kind mentioned at the beginning, as known, for example, from DE-OS 2 917 406 but which is designed, in accordance with the invention, such that its sealing plate is provided with several sensor elements associated with the combustion chamber orifices for the cylinder-specific detection of the sealing gap movements perpendicular to the plane of the sealing plate which are caused by the pressure changes in the respective combustion chamber, that, furthermore, the sensor elements are arranged outside of the combustion chamber sealing elements, and that, finally, the sensor elements belong to the following group: Piezoelectric, piezoresistive and capacitive sensors as well as glass fiber light guide sensors with transmission loss changeable by bending the light guide axis. Such sensors are characterized, above all, by the following advantages: They are sufficiently resistant to the temperatures and vibrations to which they are exposed in a cylinder head gasket during engine operation, they can be constructed sufficiently small and are available at low cost and, above all, the piezoelectric and the above-mentioned glass fiber light guide sensors ensure such a high signal level that electromagnetic interference factors are of no great importance. Owing to the arrangement of the sensor elements outside of the combustion chamber sealing elements, the disadvantage mentioned hereinabove in the discussion of known cylinder head gaskets do not occur. Furthermore, the inertialess response of the sensor elements to be used in accordance with the invention is to be emphasized, an advantage which the temperature sensors of the known cylinder head gaskets according to the previously discussed DE-OS 3 006 603 do not have. Owing to the integration of several sensor elements in the cylinder head gasket, preferably at locations of the sealing plate which are immediately adjacent to the combustion chamber orifices, the combustion processes in the various cylinders can be reliably detected in a cylinder-selective manner because the sealing gap oscillations perpendicular to the plane of the sealing plate which are caused by the combustion pressure are detected for each cylinder and signals are obtained which enable monitoring and control and regulation of the combustion process. Herein, no elaborate structural measures are necessary on the engine components (engine block and cylinder head), as is the case in the prior art, when the combustion process is detected in a cylinder-selective manner. Moreover, owing to the arrangement of the sensor elements outside of the combustion chamber sealing elements, reliable combustion chamber sealing which is always difficult to implement is not endangered.

Use of an inventive cylinder head gasket enables not only continuous monitoring of the engine but, in particular, early recognition of engine defects such as, for example, misfirings, over the entire operating range; therefore, countermeasures can already be taken before the total failure of an important component so that, for example, the fuel supply to a cylinder can be cut off when a spark plug has failed several times. Precisely this possibility of early recognition of crawling defects such as, for example, leakage of the induction system or failure of an injection valve, is a special advantage achievable with an inventive cylinder head gasket as such defects have hitherto only been detected upon total failure of the respective component. This represents a considerable advance as currently only an exhaust gas test on the dynamometer allows definite checking of a vehicle engine, i.e., the prior art offers only an indirect measuring method, but no continuously operating measuring system fixed on the vehicle. Also the sensor elements of an inventive cylinder head gasket provide a definite signal as regards knocking combustion for each cylinder, which enables saving of the hitherto used, separate knock sensors—the conventional knock sensors detect the high-frequency oscillations (approximately 7 kHz) caused by the sudden combustion of the mixture far away from the place of origin, whereas with use of an inventive cylinder head gasket, the oscillations are detected in the immediate vicinity of the place of origin, i.e., the sensor elements deliver a specific signal for the knocking combustion without strong, superimposed interferences, for example, in the form of oscillations caused by piston slap or by the valve drive, interferences which in the prior art always require electronic processing of the signal provided by the knock sensor with the use of window functions and filters. Hence the inventive cylinder head gasket enables simplification of the signal processing and provides more definite signals, and particularly in view of the knocking of an engine, the inventive cylinder head gasket represents a great advance owing to the obtaining of cylinder-specific signals because, as mentioned previously, the knocking sensitivity of the various cylinders of a multi-cylinder internal combustion engine can differ to quite an extent.

Furthermore, with use of an inventive cylinder head gasket, pre-ignitions (inflaming of the mixture by locally limited, hot points in the combustion chamber prior to the desired point of ignition) can be immediately recognized so that appropriate countermeasures can be introduced at once by the electronic engine managing system. Since changes in the sealing gap between engine block and cylinder head or changes in the thickness of the sealing plate of the cylinder head gasket are caused by the combustion process, the invention makes it possible for the phase position of the combustion process relative to the rotational angle position of the crankshaft to be directly detected in a continuous and cylinder-specific manner so that the known engine control systems can be extended to a control circuit. In this way an optimum point of ignition can be ensured for all operating conditions, for example, also for unstable engine operation. Furthermore, the regulation of the combustion process represents an aid in reliably controlling the so-called lean operation of an internal combustion engine with air conditions of more than 1.6. Evaluation of the signals of the sensor elements of an inventive cylinder head gasket with respect to the pressure gradient (pressure rise in the combustion chamber per degree of rotational angle of crankshaft) also offers the possibility of optimizing the combustion process with respect to lower sound emission. Owing to the increasing traffic density and today's demands for comfort, the idling behavior of an internal combustion engine is becoming increasingly important, more specifically, with respect to exhaust gas emission, fuel consumption and idling quality (noise development, disturbing misfirings, noticeable vibrations of the vehicle). However, known special regulating devices for controlling the idling speed only intervene when the combustion process is already terminated—here the invention with its direct monitoring of the combustion process offers much better possibilities for intervening.

In principle, the sensor elements of an inventive cylinder head gasket can be arranged anywhere on or in the sealing plate if their spatial relation to the combustion chamber orifices is such that they generate sufficiently cylinder-selective signals. Also a separate sensor element does not have to be provided for each combustion chamber orifice; it is, for example, possible to arrange the sensor elements in the gussets of the sealing plate between the combustion chamber orifices so that each sensor element is at the same spacing from two adjacent combustion chamber orifices—it is then only necessary to separate the specific signals generated by a certain sensor element for the two adjacent combustion chambers in an electronic evaluating system and allocate these clearly to the two combustion chambers, which is unproblematic insofar as every present-day engine is equipped with a rotational angle sensor coupled with the crankshaft anyhow so that the signals generated by this sensor element can be readily specifically allocated to the two adjacent combustion chambers in the electronic evaluating system by means of window functions. However, embodiments of the inventive cylinder head gasket are preferred in which at least one sensor element is provided for each combustion chamber orifice.

Finally, it should be pointed out that the behavior of the combustion chamber pressure does not have to be detected as an absolute value by the sensors of an inventive cylinder head gasket, but only a signal has to be generated to enable determination of that rotational angle position of the crankshaft at which the maximum combustion chamber pressure occurs in the associated cylinder. Therefore, only a relative measurement with subsequent, simple peak value determination is necessary and so ageing of the sensor elements is not critical.

In a cylinder head gasket whose sealing plate is approximately rectangular with screw holes for cylinder head screws approximately along lines extending parallel to its longitudinal edges and web-like regions between its combustion chamber orifices, the screw holes being arranged approximately in the extensions of these web-like regions, it is recommendable to provide at least one sensor element for each combustion chamber orifice and to arrange the sensor elements in the regions between the screw holes. This preferred embodiment is based on the following recognition: As changes in the sealing gap or changes in the thickness of the sealing plate of the cylinder head gasket are caused by the combustion process and these changes are greatest approximately at the center between the cylinder head screws owing to the engine component elasticities, such an inventive cylinder head gasket results not only in cylinder-specific signals but also in signals which are particularly easy to process on account of the low noise component; this applies particularly when sensor elements extending over a small area are arranged at the center between the cylinder head screws.

From ATZ 70, (1968) 6, page 211, picture 5, it is known to detect the sealing gap oscillations between two cylinder head screws, but this prior art shows a construction which is not at all comparable with the inventive cylinder head gasket for the following reasons: In the known construction, the housing of an inductive displacement sensor is fixedly connected to the top surface of a cylinder head base plate, and a pin-shaped feeler which actuates the inductive displacement sensor engages through the cylinder head base plate and the sealing plate of the cylinder head gasket and rests against the top surface of the engine block. The feeler extends through a hole in the cylinder head sealing plate which penetrates the combustion chamber border and thereby weakens it. Moreover, this known device does not measure the movements of the cylinder head underside with respect to the engine block side exactly on account of the attachment of the housing of the inductive displacement sensor to the top surface of the cylinder head base plate. Finally, the geometrical size and the acceleration sensitivity to engine oscillations lead to additional problems, and elaborate sealing of the feeler pin from the cooling water area is necessary. If the teaching from ATZ 70 (1968) 6, page 211, picture 5 were transferred to the cylinder head gasket of DE-OS 2 917 406, the sensor integrated in the sealing plate would have to be arranged between the flanges of the combustion chamber borders of C-shaped cross section, which would produce the disadvantages previously explained hereinabove.

If it is assumed that sensor elements which have a constant active surface are used in an inventive cylinder head gasket, suitable sensor elements made available by the prior art detect either the change in displacement of the surfaces of engine block and cylinder head delimiting the sealing gap or the change in the surface pressure acting on the cylinder head gasket or (in the case of a constant sensor surface) the change in the force acting on the respective sensor element. Passive or active detectors can be used for the sensor elements which are to be integrated in accordance with the invention in the cylinder head gasket; examples of passive detectors are piezoresistive sensor elements and the above-mentioned glass fiber light guide sensors but also capacitive sensors; examples of active detectors are piezoelectric sensor elements such as piezoelectric ceramic discs or piezoelectric foils.

The sensor elements of inventive cylinder head gaskets can be formed by discrete components; here piezoelectric ceramic discs are preferred. Alternatively, the sensor elements can, however, also be formed by sensitive areas of an elongate sensor which runs past all combustion chamber orifices; such an embodiment can be realized in two different ways: Either the elongate sensor has inactive areas between its sensitive areas associated with the various combustion chamber orifices or the elongate sensor is sensitive over its entire length and the signals generated by its sensitive areas associated with the various combustion chamber orifices are, as mentioned previously hereinabove, divided up by an electronic evaluating system, for example, with the assistance of window functions and clearly allocated to the various cylinders. In the last-mentioned case, one requires only a single signal tap at the elongate sensor. Division of the elongate sensor into sensitive areas associated with the individual combustion chamber orifices and into inactive areas can be implemented in different ways: The elongate sensor can be placed on or in the sealing plate, for example, such that the sensor sections forming the sensitive areas lie close to the combustion chamber orifices and the remaining sensor sections lie in areas of the cylinder head gasket which are not pressed when the cylinder head gasket is mounted. It is, however, also possible to place the sensor sections forming the inactive areas, for example, in stiff tubes or the like so that they are not pressed or exposed to alternating pressures or deformations.

Optimum signals are obtained when in an inventive cylinder head gasket the sensor elements are arranged as close as possible (even if, for example, cooling water ports lie between the sensor elements and the combustion chamber orifices) to the adjacent combustion chamber sealing elements, but not in the area of the actual combustion chamber sealing elements—temperatures which are still intolerably high for the sensor elements may prevail there, and the geometrical relations would make the configuration and arrangement of the sensor elements considerably more difficult.

If the sensor elements or sensors of inventive cylinder head gaskets are glass fiber light guide sensors with transmission loss changeable by bending the light guide axis, the ends of such a light guide have, of course, to be provided or coupled with a light emitter and a light receiver; these elements can, however, be readily arranged outside of the areas exposed to high temperatures and strong vibrations.

The subject matter of the invention is, furthermore, the use of an inventive cylinder head gasket in a reciprocating internal combustion engine comprising a control and/or regulating and/or monitoring circuit, wherein, in accordance with the invention, the sensor elements of the cylinder head gasket are components of this circuit. In particular, the sensor elements are used to recognize misfirings and, in the given circumstances, to cut off the fuel supply to the corresponding cylinder and/or as knock sensors and, in the given circumstances, to change the point of ignition of the respectively associated cylinder. It may also prove expedient to arrange a further part of the circuit on the sealing plate apart from the sensor elements, more specifically, on an edge area of the sealing plate which is exposed when the cylinder head gasket is mounted; this circuit part is, in particular, a preamplifier for improving the quality of the signals generated by the sensor elements.

Figure 2:
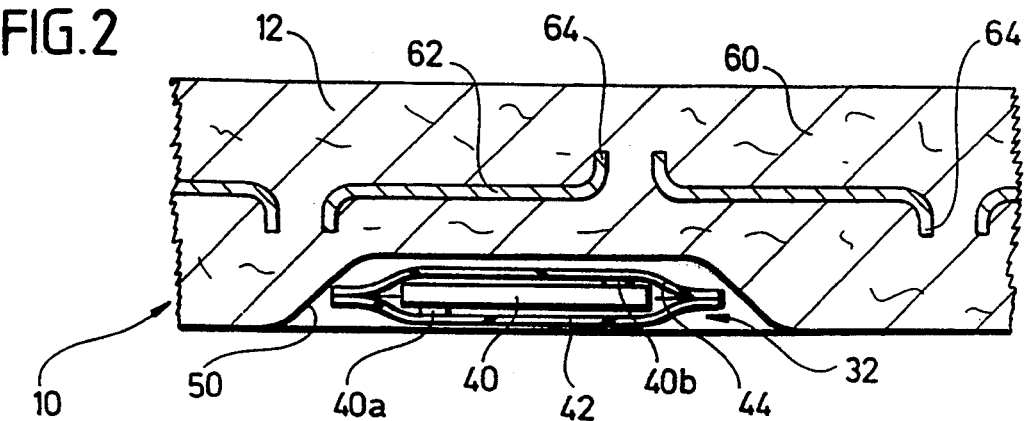
Figure 3A:
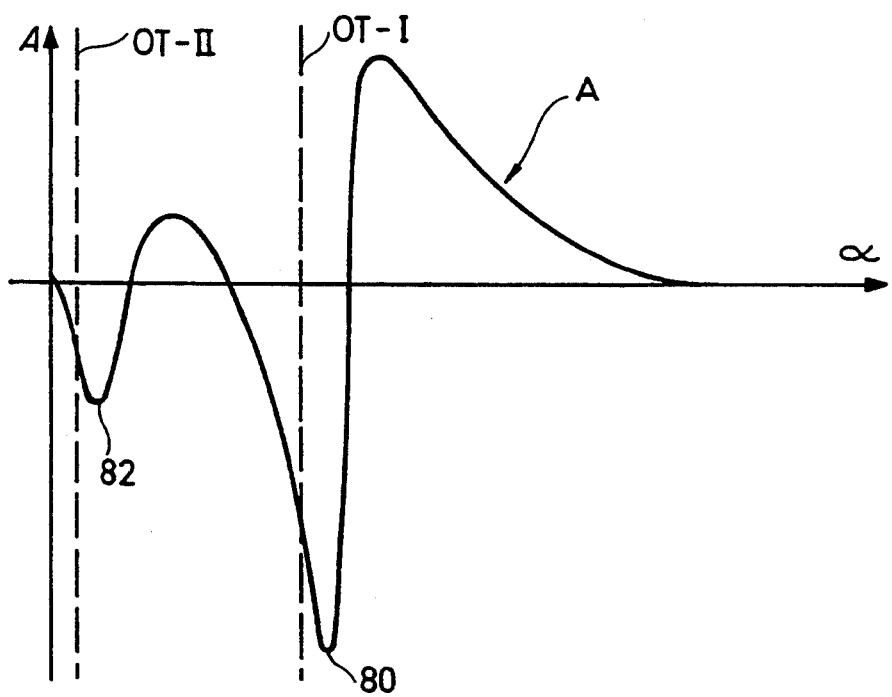
Figure 3B:
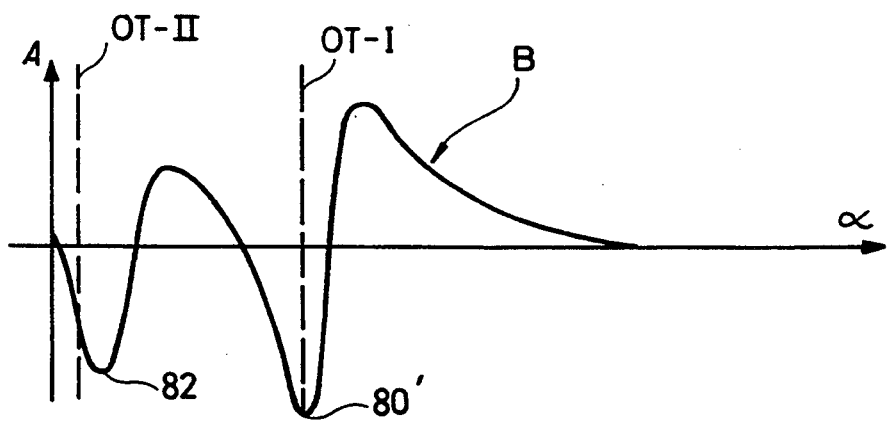

Further features, advantages and details of the invention are also to be found in the following description and the appended drawings of several preferred embodiments of the inventive cylinder head gasket; the drawings show:

FIG. 1 a plan view of a first embodiment of the inventive cylinder head gasket for a four-cylinder engine, but it should be noted that the number of cylinders could be different;

FIG. 2 a section through this cylinder head gasket along line 2—2 in FIG. 1;

FIGS. 3a and 3B two diagrams in which the signals generated by a piezoelectric sensor element of an inventive cylinder head gasket are plotted against the rotational angle position of the crankshaft, with FIG. 3a showing the signal curve in the case of ignition in the cylinder associated with the sensor element and FIG. 3b the signal curve without ignition in this cylinder;

FIG. 4 a section corresponding to FIG. 2 through a second embodiment of the inventive cylinder head gasket;

FIG. 5 a section through a further embodiment of a sensor element for an inventive cylinder head gasket, with the section corresponding to the sectional illustrations in FIGS. 2 and 4;

FIG. 6 a highly simplified plan view of a further embodiment of the inventive cylinder head gasket which in contrast with the embodiment shown in FIG. 1 does not have several discrete sensor elements but instead an elongate sensor common to all combustion chamber orifices which is connected to a schematically represented electronic evaluating system;

FIG. 7 a section through this cylinder head gasket along line 7—7 in FIG. 6;

FIG. 8 a section through part of a further embodiment of the inventive cylinder head gasket, with the section being taken on line 8—8 in FIG. 6; and FIG. 9 a schematic plan view of a partial area of a further embodiment of the inventive cylinder head gasket.

FIG. 1 shows a cylinder head gasket 10 with a sealing plate 12 having four combustion chamber orifices 14, 16, 18 and 20, with the edge regions of the sealing plate 12 surrounding the combustion chamber orifices being bordered with so-called combustion chamber borders 22. These combustion chamber borders are ring-shaped sheet metal elements of C-shaped cross section which engage over the edges of the sealing plate 12. Instead of such combustion chamber borders, any other combustion chamber sealing elements of a known kind can, of course, also be used. Between the combustion chamber orifices 16 and. 18, the combustion chamber borders 22 were partly broken away to illustrate that the sealing plate 12 forms between the combustion chamber orifices webs 24 in the extension of which the gasket 10 is provided with screw holes 26 for cylinder head screws. Two further screw holes 26 are located in each case beside the terminal combustion chamber orifices and the narrow sides of the sealing plate.

In the region of its one longitudinal side, the sealing plate 12 is provided in accordance with the invention with a web-like projection 30; when the cylinder head gasket is mounted in the engine, all of the regions of the sealing plate 12 are covered throughout their entire surface by the cylinder head and the engine block with the exception of this projection 30 which protrudes at the side beyond the engine block and the cylinder head.

FIG. 1 shows a plan view of the cylinder head gasket, more specifically, viewed from the side of the engine block. On account of the lower component temperature, there is preferably attached, in particular adhesively, to this side of the sealing plate a sensor unit 32 which, as will be explained with reference to FIG. 2, consists of two sheets, sensor elements arranged between these, electric connection lines and contact elements.

As shown in FIG. 1, there is located between two screw holes 26 and between the associated combustion chamber orifice, on the one hand, and the top longitudinal edge of the sealing plate 12 according to FIG. 1, on the other hand, in each case, a sensor element 34, 36, 38, 40 which, as shown in FIG. 2, has the shape of a small flat plate with two connection lines 34a, 34b; 36a, 36b, etc., connected to it in each respective case. The sensor elements and the connection lines lie between two sheets 42 and 44 whose shape corresponds in the plan view to that of the entire sensor unit 32 and whose edges are intimately joined, in particular by welding or adhesion, as indicated in FIG. 2. On the face of the sheet 42 facing outwards there are eight plate-shaped metallic contact elements $46^1$ to $46^8$ arranged alongside one another in a row on the projection 30, with the connection line 34a leading to the contact element $46^1$, the connection line 34b to the contact element $46^2$, the connection line 36a to the contact element $46^3$, the connection line 36b to the contact element $46^4$, the connection line 38a to the contact element $46^5$, the connection line 38b to the contact element $46^6$, the connection line 40a to the contact element $46^7$ and the connection line 40b to the contact element $46^8$. When the inventive cylinder head gasket is connected to a control and/or regulating and/or monitoring circuit, the contact elements $46^2$, $46^4$, $46^6$ and $46^8$ are connected to one another and to ground whereas at the contact elements $46^1$, $46^3$, $46^5$ and $46^7$ signals can be picked up which are specific for cylinder I, cylinder II, cylinder III and cylinder IV, respectively, which correspond to the combustion chamber orifices 14, 16, 18 and 20. On account of the projection 30 of the inventive cylinder head gasket and the contact elements $46^1$ to $46^8$ arranged on it, these signals can be picked up simply with a multipole plug connector 70 which can be attached to the projection 30 of the cylinder head gasket. The plug connector can also be electrically wired. Furthermore, it is possible to connect the connection lines directly to an electronic amplifier (for example, thick film circuit) which is arranged between the foils 42 and 44 or on the top surface of the foil 42 in the region of the projection 30.

As the sensor elements are advantageously arranged on the side of the cylinder head gasket facing the engine block, the sealing plate 12 has indentations 50 (see FIG. 2) on this side, more specifically, either a single indentation stepped depth-wise for the entire sensor unit 32 or—owing to the small thickness of the sheets 42 and 44 and of the connection lines—a separate indentation for each of the sensor elements.

The cylinder head gasket illustrated in the appended drawings is one in which its sealing plate consists of a metal carrier plate 62 which is coated on both sides with so-called soft material 60 and from which anchoring tongues 64 are bent outwards on both sides to anchor the layers of soft material to the metal carrier plate. Of course, these anchoring tongues must be of such dimensions or deformed in such a manner by stamping that there is no danger of the sensor unit 32 being damaged by the anchoring tongues when the cylinder head is tightened. The sensor unit can, however, also be used in conjunction with cylinder head gaskets of a different design, for example, with a sealing plate consisting of single- or multi-layer sheet metal.

In the drawings, the connection lines were drawn so as to run essentially in a straight line. However, this was done merely to simplify the illustration for in the preferred embodiment of the inventive cylinder head gasket the connection lines should have a meandering course and, in particular, take the form of conductor tracks which are printed on the sheets and are then conductively connected to the contact elements $46^1$ to $46^8$ through the foils.

The remaining components of the cylinder head gasket shown in FIG. 1 were not described as these do not relate to the present invention. Also not illustrated was the control and/or regulating and/or monitoring circuit to which the sensor unit 32 is connected. Only part of a plug connector 70 which can be pushed onto the projection 30 to electrically conductively connect the contact elements with the above-mentioned circuit was indicated in FIG. 1.

In accordance with the invention, the sensor elements 34 and 40 could also be arranged between the terminal screw holes 26; it is, however, also conceivable to arrange two additional sensor elements between these terminal screw holes 26.

In accordance with a further feature of the invention, the sensor elements are advantageously arranged on that longitudinal side of the sealing plate which is located opposite the exhaust manifold side of the engine in order to keep the temperature load on the sensor elements as low as possible.

Finally, it is also to be seen as lying within the scope of the invention to arrange only a single sensor element at one of the locations designated hereinabove. Its signal is then used for controlling and regulating concepts of all of the cylinders; one then proceeds from the simplification that all of the cylinders behave identically.

In the explanation of FIG. 3 (FIGS. 3a and 3b) it is assumed that the two diagrams show the, in the given circumstances, amplified output signal of the sensor element 34 which is allocated to the combustion chamber orifice 14 for the first cylinder (cylinder I). The output signal of a piezoelectric sensor element was recorded, more specifically, the signal amplitude A was plotted as ordinate against the rotational angle (abscissa) of the crankshaft. Those crankshaft positions in which the piston of cylinder I and the piston of cylinder II belonging to the combustion chamber orifice 16 are at the upper dead center where designated OT-I and OT-II, respectively. As mentioned previously, FIG. 3a shows the output signal of the sensor element 34 allocated to cylinder I during normal engine operation, i.e., with ignition of the mixture in cylinders I and II, whereas FIG. 3b shows the output signal of the sensor element 34 allocated to cylinder I after the spark plug connector for cylinder I was removed—i.e., the mixture in cylinder II was ignited in a normal way. In accordance with the combustion process, the output signal A illustrated in FIG. 3a has an extreme value 80 after the upper dead center OT-I of the piston of cylinder I, whereas a following, considerably lower extreme value 82 of the output signal A is due to the change in the sealing gap at the location of the sensor element 34 allocated to cylinder I which was caused by the combustion process in the neighboring cylinder II.

The output signal B of the sensor element 34 illustrated in FIG. 3b shows a first extreme value 80' which is not only substantially smaller than the first extreme value 80 of the output signal A but also lies precisely at the upper dead center OT-I of the piston of cylinder I. The reduction in size and shift of the first extreme value 80' of the output signal B in comparison with the first extreme value 80 of the output signal A are due to the flatter pressure gradient without an ignition process (polytropic compression) in cylinder I, whereas the second extreme value 82 of the output signal B corresponds, as is to be expected, with respect to size and phase position to the second extreme value 82 of the output signal A because an ignition process also took place in cylinder II when the output signal B was recorded.

Hence comparison of FIGS. 3a and 3b shows that the sensor element 34 clearly indicates a misfiring or combustion failure in cylinder I, more specifically, both by displacement of the signal maximum or extreme value 80' to the upper dead center OT-I of cylinder I and by a very clear reduction in size of the signal maximum or extreme signal value compared with the signal maximum or extreme signal value obtained when ignition took place.

For reasons of completion, it should be noted that FIGS. 3a and 3b illustrate the output signals A and B in smoothed form for in reality the illustrated useful signals are superimposed by high-frequency interference signals whose amplitudes, however, are only a fraction of the amplitudes of the useful signals.

FIG. 4 shows a particularly preferred embodiment of a sensor element integrated in a cylinder head gasket. This consists of a small piezoelectric ceramic disc 84 which is welded in between plastic sheets 86 and 88. The plastic sheets 86, 88 are preferably—as in the embodiment according to FIGS. 1 and 2—strips of sheet between which the ceramic discs 84 are arranged for all combustion chamber orifices of the cylinder head gasket.

A polyimide sheet is preferably used as it is resistant to temperatures of up to approximately 400° C. and can be laminated, metal-coated, stamped, cut and coated with adhesive. Between the plastic sheets 86 and 88 and the ceramic disc 84 there extend metallic conductor tracks 90 and 92 which are preferably conductor tracks which are printed or mounted in some other way on the plastic sheets and by means of which the ceramic disc 84 is contacted on its two opposite main surfaces to enable the electric signal generated by the piezoelectric ceramic disc when acted upon by pressure to be picked up. The sensor element designated in its entirety 94 is arranged in an opening 96 which, in particular, is stamped out of a sealing plate 98 of the cylinder head gasket, more specifically, such that the top main surface 100 of the sensor element 94 is flush with the top main surface 102 of the sealing plate 98. The region of the opening 96 located below the sensor element 94 is filled out with a relatively hard elastomeric material 104 so that when the cylinder head gasket is mounted between cylinder head and engine block, the sensor element 94 is acted upon by pressures which change in accordance with the combustion process.

The conductor tracks 90, 92 or other conductor elements contacting the ceramic disc 84 preferably consist of silver. In a variant of the embodiment shown in FIG. 4, the sensor element 94 could also be arranged more inside the opening 96, in which case this opening is then filled from both sides with a suitable elastomeric material so as to enable transfer of the force and adaptation to the engine component surfaces; in this case the two plastic sheets 86 and 88 could also be dispensed with as the ceramic disc together with the contact elements can be sealed off against all media with which the cylinder head gasket comes into contact (above all, cooling water and engine oil) with the elastomeric layers arranged on both sides of the ceramic disc 84. In each case, the plastic sheets and/or the elastomeric layers eliminate the danger of an electric short circuit. The metallic contact elements can be additionally soldered or connected to the ceramic disc 84 by an electrically conductive adhesive.

In the embodiment illustrated in FIG. 4, the engine block or the cylinder head could form a common ground contact for the ceramic discs of all sensor elements if the top plastic sheet 86 is dispensed with and the top conductor track 90 or a metal-coated region of the top surface of the ceramic disc 84 is flush with the top main surface 102 of the sealing plate 98. Above all, in this case, the sensor element could be sealed against water and oil by the sealing plate 98 being provided on its top main surface 102, for example, in a screen printing process, with an elastomeric sealing bead which completely encloses the opening 96.

In a preferred embodiment, the ceramic disc 84 has a round shape with a diameter of approximately 5 mm. Such piezoelectric ceramic discs are commercially available with a thickness of approximately 0.2 mm onwards. The diameter of the ceramic disc should be as small as possible in order that the bending stress to which the ceramic disc is subjected will also be low as there will otherwise be a risk of it breaking on account of the brittleness of ceramic material. Also such small sensor elements can be arranged sufficiently close to the combustion chamber orifices with any geometrical design of the cylinder head gasket. The elastomeric materials used to imbed or support the sensor elements on one side should be relatively hard so that high-frequency oscillations (approximately 7 kHz in the case of knocking combustion) are detected and a high measuring efficiency thus achieved. On the other hand, the elastomeric material should be sufficiently soft to enable adaptation to the engine components (engine block and cylinder head). The elastomeric material should also be resistant to creep. Prior to assembly in the sealing plate of the cylinder head gasket, the ceramic discs are expediently soldered or adhesively connected to a plastic sheet provided with the conductor tracks, the sheet is then placed on the sealing plate in such a way that the ceramic discs engage in the openings of the sealing plate and these openings are then filled out with the elastomeric material from the rear side.

The embodiment illustrated in FIG. 5 of a sensor element 106 which again contains a piezoelectric ceramic disc 108 as main component is particularly well suited for this installation variant. The two opposite main surfaces of the ceramic disc 108 are provided with metallic contact layers 110 and 112, the ceramic disc is received by a metallic casing 114 which is open at the top and simultaneously serves as housing and as one of the two electrodes, and the interior of the casing 114 which is not filled out by the ceramic disc 108 is filled with a suitable insulating material 116. The sensor element 106 is attached to a plastic sheet 118 which has metallic conductor tracks 120 and 122 printed on it, with the conductor track 120 contacting the contact layer 110 and the conductor tracks 122 the metallic casing 114. Other contact elements can, of course, also be used instead of the conductor tracks 120 and 122.

Instead of the polyimide sheets mentioned hereinabove, temperature-resistant polyester sheets can also be used.

The embodiment of an inventive cylinder head gasket illustrated in FIGS. 6 and 7 has an elongate sensor 130 which extends past all of the combustion chamber orifices of the cylinder head gasket. The sensor 130 is a known piezoelectric elastomer cable, but in like manner the sensor could also be designed as a glass fiber light guide sensor, which will be explained in further detail hereinbelow.

The cylinder head gasket 132 shown in FIG. 6 has a sealing plate 134 with combustion chamber orifices 14', 16', 18' and 20' provided with combustion chamber borders 136 as well as screw holes 26' for cylinder head screws.

The output signals generated by the sensor 130 are picked up via lines 138 and 140 and fed to a microprocessor 142 which is also fed via a line 144 the incremental output signal of a rotational angle detector 146 which is coupled with the crankshaft of the internal combustion engine and whose output signal represents the respective rotational angle position of the crankshaft. An output line 148 of the microprocessor 142 leads to the engine control system which is not illustrated.

FIG. 7 shows the sealing plate 134 and a combustion chamber border 136. The sealing plate 134 consists essentially of a metal carrier plate 150 from which stamped-out and bent anchoring tongues 152 protrude upwards and downwards. These serve to join to the metal carrier plate two layers of soft material 154 and 156 which are rolled onto the two sides of the metal carrier plate 150. The anchoring tongues 152 are arranged in rows running parallel to the longitudinal edges 158 and 160 of the sealing plate 134. Beside a row of anchoring tongues protruding upwards from the metal carrier plate there extend two rows of anchoring tongues protruding downwards from the metal carrier plate (and vice-versa).

In accordance with the invention, there is stamped out of the sealing plate 134 a longitudinal slot 162 with its ends expediently not extending as far as the edge of the sealing plate 134 so as not to impair the rigidity of the sealing plate. Inserted in this longitudinal slot is the elongate sensor 130 whose diameter is advantageously identical with the thickness of the sealing plate 134. The area of the longitudinal slot 162 which is still free is again filled out with an elastomeric material 164 in which the sensor 134 is embedded and which also serves to secure the sensor 130 in the longitudinal slot 162.

The sensor 130 is formed by a commercially available, piezoelectric elastomer cable which is designed in the fashion of a coaxial cable and consists of a jacket-like, metallic outer conductor 166, a metallic inner conductor 168 forming a core and an elastomeric, piezoelectric material surrounding the inner conductor 168 and filling out the outer conductor 166. At all the locations where the sensor 130 is pressed by pressures which vary with respect to time, the elastomeric, piezoelectric material generates an electric potential difference between inner conductor 168 and outer conductor 166 which varies with respect to time; the electric output signal of the sensor 130 which is based on these potential differences which vary with respect to time can be picked up via the lines 138 and 140 which are connected at one end of the sensor to the outer conductor 166 and the inner conductor 168, respectively. The microprocessor 142 now has a window function for detecting the desired useful signals individually associated with the combustion chamber orifices 14', 16', 18' and 20' and for fading out all of the other parts of the output signal of the sensor 130; this window function is controlled by the output signal of the rotational angle detector 146 in such a way that there only appear on the output line 148 of the microprocessor 142 those useful signals which are generated by the sensor 130 within rotational angle ranges of the crankshaft which are predetermined by the window function of the microprocessor. If, for example, misfirings are to be recognized by the sensor 130, these rotational angle ranges lie such that they contain the upper dead centers of the pistons of the four cylinders allocated to the four combustion chamber orifices 14', 16', 18' and 20'. In this way it is ensured that of the output signals generated by the sensor 130, only those parts are utilized as useful signals which can be strictly and cylinder-specifically allocated to those periods of time during the combustion processes in the various cylinders which are of interest for the monitoring of the engine, whereas all other parts of the output signals generated by the sensor 130 are faded out by the window function of the microprocessor 142.

Therefore, in the embodiment according to FIGS. 6 and 7, the sections of the sensor 130 located closest to the combustion chamber orifices 14', 16', 18' and 20' form the sensor elements or sensitive sensor areas within the meaning of the present invention.

If the sensor 130 is formed by a piezoelectric elastomer cable, it can additionally assume the sealing function of an elastomeric sealing bead in the way in which it is otherwise often attached to the sealing plate of a cylinder head gasket; it is then merely necessary to allow the piezoelectric elastomer cable to protrude on one or both sides beyond the sealing plate. The same also applies to the elastomeric material 164 in which the piezoelectric elastomer cable is embedded. A special advantage of the sensor 130 in the form of a coaxial cable is to be seen in the fact that electric interferences acting from the outside are well shielded off by the outer conductor 166 and electric shielding from a connection plug for the sensor is possible in a simple way. In a modification of the illustrated embodiment, it is, furthermore, possible to provide a separate, shorter sensor for each individual combustion chamber orifice. Instead of a sensor cable, a flat sensor plate or plates can also be used—these are constructed like a capacitor with the piezoelectric, elastomeric material replacing an insulating dielectric.

FIG. 8 shows a section of a further embodiment of an inventive cylinder head gasket which with the exception of the type of the sensor can, in principle, correspond to the embodiment according to FIGS. 6 and 7. FIG. 8 shows an area of a sealing plate 180 which is constructed in exactly the same way as the sealing plate 134 of the cylinder head gasket according to FIGS. 6 and 7; its metal carrier plate was designated 182, the anchoring tongues protruding in one direction from the metal carrier plate are indicated in a row of such tongues at 184. In FIG. 8, however, one sees only one of the two layers of soft material, namely the layer of soft material 186 corresponding to the layer of soft material 156 according to FIG. 7 as there was machined in the top layer of soft material of the embodiment according to FIG. 8 a groove which extends only as far as the metal carrier plate 182 and in which an elongate sensor 188 corresponding to the sensor 130 of the embodiment according to FIGS. 6 and 7 was inserted. The groove was then filled out with a relatively hard, elastomeric material 190. In accordance with the invention, the sensor 188 is a known glass fiber light guide sensor with its transmission loss being changeable as a function of time by time-variable bending of the light guide axis. This is a known effect—by deformation of the glass fiber light guide in the sense of micro-bendings of the light guide axis, light exits from the light guide at the bending locations, whereby the transmission loss of the light guide is increased; therefore, if the light guide is bent to different degrees at certain locations as a function of time, the transmission loss likewise changes at these locations as a function of time.

As the metal carrier plate 182 unavoidably becomes uneven when the two layers of soft material are rolled onto it, the sensor 188 is bent to different degrees along its axis when it is placed on the metal carrier plate 182 and the changes in the sealing gap which occur during operation of the engine then result in corresponding changes in the bendings of the light guide with respect to time and hence in corresponding changes in the transmission loss with respect to time in the areas of the sensor 188 which are relevant for the registering of the combustion process.

If a common glass fiber light guide sensor is used for all of the combustion chamber orifices of the inventive cylinder head gasket, the same applies to the processing of the signals as was stated in connection with the embodiment according to FIGS. 6 and 7.

Finally, a section of a further embodiment of the inventive cylinder head gasket is shown in a plan view in FIG. 9. FIG. 9 shows a sealing plate 200 with two combustion chamber orifices 14" and 16", the edge areas of the sealing plate 200 surrounding these combustion chamber orifices again being provided with combustion chamber borders 202. Screw holes in the sealing plate 200 were designated 204.

An elongate sensor 206 is positioned on the sealing plate 200, but it can also be embedded in the sealing plate. In this embodiment, too, the sensor 206 is again to extend past all of the combustion chamber orifices of the cylinder head gasket, i.e., it is to be common to all of these combustion chamber orifices. The sensor 206 is a multilayer strip of sheet, more specifically, preferably a strip of sheet with a piezoelectric, elastomeric layer or with a dielectric layer so that in the latter case the sensor 206 is a capacitive sensor. For the cylinder-specific registering of the combustion process, there are arranged in the regions of the sensor 206 located closest to the combustion chamber orifices at the top and bottom on the piezoelectric or dielectric layer metallic contact layers 208 which for reliable avoidance of electric short circuits are preferably substantially narrower than the piezoelectric or dielectric layer and from each of which a conductor track 210 leads away in order to pick up a sensor signal in each sensor area which is relevant for the cylinder-selective registering of the combustion process.

As mentioned previously hereinabove, in all of the embodiments with piezoelectric sensor elements illustrated and described herein, these can be replaced by piezoresistive sensor elements.

If an elongate sensor in the form of a piezoelectric strip of sheet common to all combustion chamber orifices is used, it is recommendable to make the sensor strip wider in the region of the sealing plate between the screw holes than in the other regions in order to improve the ratio of the useful signal to interference signal components.

Instead of the plug connection explained in conjunction with FIG. 1, the connection lines leading to the sensor elements or to the sensitive areas of the sensor could also be led away from the cylinder head gasket in the form of a cable harness in order to avoid the risk of a plug which is attached to the cylinder head gasket becoming released from the cylinder head gasket on account of vibrations occurring during operation.

In embodiments such as that of FIG. 8 in which the soft material of the sealing plate is partially removed, it is not absolutely necessary to remove the soft material as far as the metal carrier plate as a thin layer of the soft material can readily remain on the metal carrier plate without impairing operation of the sensor, it may even be sufficient to simply impress a depression such as a channel in the soft material.

The elastomeric materials used to embed or cover the sensor elements or a sensor and metallic contact and/or conductor layers are expediently applied in a screen printing process.

If a metal carrier plate without anchoring tongues is used, i.e., a smooth metal carrier plate, the unevennesses required for a glass fiber light guide sensor can also be brought about with a corresponding tool, for example, during the impressing of a channel for receiving the sensor in the soft material of the sealing plate.

Special mention should also be made of the fact that the metal casing 114 shown in FIG. 5 has the advantage that the ceramic disc cannot be destroyed by slide movements occurring between cylinder head, cylinder head gasket and engine block during operation of the engine Finally, reference will also be made to another embodiment of a sensor or sensor element which can be used in accordance with the invention: The pressure forces generated by the sealing gap oscillations perpendicular to the plane of the cylinder head gasket which act on the latter and vary with respect to time can be used to change the electric transition resistance between two superimposed, electrically conductive elements so that these two elements form a resistive sensor element within the meaning of the present invention. Such sensors are known in a completely different field, and in this connection reference is to be had to U.S. Pat. No. 4,734,034, the disclosure of which is to constitute part of the present application.

Regarding the recognition of knocking combustion, it should also be pointed out that with otherwise identical operating parameters (speed and torque) knocking combustion results in a clear increase in the amplitude of the signal supplied by the respective sensor element of an inventive cylinder head gasket (in comparison with normal combustion which does not knock). Knocking combustion does, however, also result in high-frequency signal components (more than 5 kHz) which are characteristic of the knocking and are likewise detectable in a reliable, cylinder-specific manner with an inventive cylinder head gasket.

I claim:

1. A generally rectangular, plate-like cylinder head gasket for sealing a gap between an engine block and a cylinder head of a multi-cylinder internal combustion engine having several combustion chambers, said gasket having two main surfaces, two longitudinal edges and two lateral edges and comprising:
   a) a group of substantially circular combustion chamber orifices;
   b) web-like areas between said combustion chamber orifices, each of said web-like areas being substantially symmetrical to an imaginary center plane oriented substantially perpendicular to said main surfaces;
   c) a generally rectangular sealing plate having at least one opening defined by an internal edge of said sealing plate and accommodating said combustion chamber orifices;
   d) screw holes for cylinder head screws, said screw holes being arranged approximately at said center planes and along lines extending parallel to said longitudinal edges; and
   e) at least one combustion chamber sealing element surrounding and thereby defining said combustion chamber orifices, said combustion chamber sealing element being fixed to the sealing plate at said internal edge of the sealing plate;

wherein, for a cylinder-specific detection of movements of said gap perpendicular to said main surfaces caused by pressure changes within the respective combustion chamber,
   f) said sealing plate is provided with sensor elements associated with said combustion chamber orifices, said sensor elements being responsive to said pressure changes;
   g) each of said sensor elements, with respect to the combustion chamber orifice associates with said sensor element, being arranged radially outwardly of the combustion chamber sealing element of said orifice;
   h) said sensor elements being disposed between said screw holes; and
   i) said sensor elements being selected from the group consisting of piezoelectric sensors, piezoresistive sensors, capacitive sensors and glass fiber light guide sensors with transmission losses changeable by bending the glass fiber light guide.

2. The gasket according to claim 1, wherein each of said sensor elements is disposed approximately at one of said lines.

3. Cylinder head gasket as defined in claim 1, wherein said sensor elements are formed by sensitive areas of an elongate sensor, said elongate sensor extending past all of said combustion chamber orifices and having inactive areas between said sensitive areas.

4. Cylinder head gasket as defined in claim 3, wherein said sensor elements comprise sections of an elongate glass fiber light guide sensor extending past all of said combustion chamber orifices, wherein said sealing plate comprises a metal carrier plate coated on both sides with soft material and provided with anchoring tongues arranged in rows extending substantially parallel to said longitudinal edges, the tongues of adjacent rows protruding from said metal carrier plate in opposite directions and engaging in said soft material, wherein said glass fiber light guide sensor is disposed on one side of the carrier plate opposite one of said rows provided on the other side of the carrier plate and is inserted in the soft material and is covered with an elastomeric substance.

5. Cylinder head gasket as defined in claim 1, wherein said sensor elements are selected from the group consisting of displacement pick-up means, force pick-up means, pressure pick-up means, and oscillation pick-up means.

6. Cylinder head gasket as defined in claim 1, wherein said sensor elements are located in the vicinity of said associated combustion chamber sealing element.

7. Cylinder head gasket as defined in claim 1, having two terminal combustion chamber orifices located adjacent said two lateral edges, wherein at least one of said sensor elements is associated with one of said terminal combustion chamber orifices, said at least one of said sensor elements being arranged between the adjacent said one of said combustion chamber orifices and the adjacent lateral edge.

8. Cylinder head gasket as defined in claim 1, wherein said sealing plate includes two main surfaces and external edge regions having a shape such that in at least one of said edge regions, at least one of the main surfaces is exposed and forms an uncovered surface area when the gasket is sealing said gap, and wherein said sensor elements are provided with connection lines extending from the sensor elements to said uncovered surface area.

9. Cylinder head gasket as defined in claim 8, wherein said uncovered surface area includes plug connection elements.

10. Cylinder head gasket as defined in claim 1, wherein said sensor elements are covered by an outer plastic sheet.

11. Cylinder head gasket as defined in claim 10, wherein said sensor elements are enclosed between said outer plastic sheet and an inner plastic sheet bonded to said sealing plate.

12. Cylinder head gasket as defined in one of claims 8 and 10, wherein said connection lines are covered by said outer plastic sheet except for connection points.

13. Cylinder head gasket as defined in claim 11, wherein said connection lines are conductor paths which are printed on one of said outer and inner plastic sheets.

14. Cylinder head gasket as defined in claim 8, wherein each of said connection lines extends in a meandering course when said gasket is viewed in plan.

15. Cylinder head gasket as defined in claim 8, wherein said connection lines are coaxial cables.

16. Cylinder head gasket as defined in claim 1, wherein said sealing plate includes two main surfaces at least one of said main surfaces being provided by a layer of soft material, and wherein said layer of soft material is provided with at least one impression receiving said sensor elements.

17. Cylinder head gasket as defined in claim 1, wherein said sealing plate includes at least one stamped out opening receiving said sensor elements.

18. Cylinder head gasket as defined in claim 1, wherein said sensor elements are covered by a surface coating applied to the sealing plate.

19. Cylinder head gasket as defined in claim 1, wherein said sealing plate includes two main surfaces and each of the sensor elements has an exposed contact point disposed adjacent a one of said main surfaces of said sealing plate.

20. A multi-cylinder internal combustion engine having several combustion chambers, an engine block, a cylinder head and a cylinder head gasket sealing a gap between said engine block and said cylinder head, said gasket having two main surfaces, two longitudinal edges and two lateral edges and comprising:
 a) a group of substantially circular combustion chamber orifices;
 b) web-like areas between said combustion chamber orifices, each of said web-like areas being substantially symmetrical to an imaginary center plane oriented substantially perpendicular to said main surfaces;
 c) a generally rectangular sealing plate having at least one opening defined by an internal edge of said sealing plate and accommodating said combustion chamber orifices;
 d) screw holes for cylinder head screws, said screw holes being arranged approximately at said center planes and along lines extending parallel to said longitudinal edges; and
 e) at least one combustion chamber sealing element surrounding and thereby defining said combustion chamber orifices, said combustion chamber sealing element being fixed to the sealing plate at said internal edge of the sealing plate;
 wherein, for a cylinder-specific detection of movements of said gap perpendicular to said main surfaces caused by pressure changes within the respective combustion chamber,
 f) said sealing plate is provided with sensor elements associated with said combustion chamber orifices, said sensor elements being responsive to said pressure changes;
 g) each of said sensor elements, with respect to the combustion chamber orifice associated with said sensor element, being arranged radially outwardly of the combustion chamber sealing element of said orifice;
 h) said sensor elements being disposed between said screw holes; and
 i) said sensor elements being selected from the group consisting of piezoelectric sensors, piezoresistive sensors, capacitive sensors and glass fiber light guide sensors with transmission losses changeable by bending the glass fiber light guide,
 said engine further comprising a circuit selected from the group consisting of a control circuit, a regulating circuit and a monitoring circuit, wherein said sensor elements are components of said circuit.

21. The engine according to claim 20, wherein said circuit comprises means for avoiding fuel supply to at least one of said combustion chambers when the sensor element associated with said combustion chamber detects misfirings in said combustion chamber.

22. The engine according to claim 20, wherein said sensor elements are knock sensors and said circuit comprises cylinder-specific point of ignition change means controlled by said sensor elements.

23. The engine according to claim 20, wherein said sealing plate includes two main surfaces and external edge regions having a shape such that in at least one of said edge regions at least one of the main surfaces of the sealing plate is exposed and forms an uncovered surface area when the gasket is sealing said gap, wherein said sensor elements are provided with connection lines extending from the sensor elements to said uncovered surface area, and wherein, apart from said sensor elements, at least a further component of said circuit is arranged on said uncovered surface area.

* * * * *